Oct. 3, 1967   J. E. WHITE   3,344,881
SEISMIC DETECTION METHOD
Filed Sept. 27, 1966   4 Sheets-Sheet 1

INVENTOR
JAMES E. WHITE
BY Sughrue, Rothwell, Mion, Zinn & Macpeak
ATTORNEYS

Oct. 3, 1967    J. E. WHITE    3,344,881
SEISMIC DETECTION METHOD
Filed Sept. 27, 1966    4 Sheets-Sheet 2

INVENTOR
JAMES E. WHITE

BY Sughrue, Rothwell, Mion,
Zinn & Macpeak
ATTORNEYS

Oct. 3, 1967  J. E. WHITE  3,344,881

SEISMIC DETECTION METHOD

Filed Sept. 27, 1966  4 Sheets-Sheet 3

INVENTOR
JAMES E. WHITE

BY Sughrue, Rothwell, Mion, Zinn & Macpeak

ATTORNEYS

INVENTOR
JAMES E. WHITE

BY Sughrue, Rothwell, Mion, Zinn & Macpeak

ATTORNEYS

United States Patent Office 3,344,881
Patented Oct. 3, 1967

3,344,881
SEISMIC DETECTION METHOD
James E. White, Littleton, Colo., assignor to Marathon Oil Company, Findlay, Ohio, a corporation of Ohio
Filed Sept. 27, 1966, Ser. No. 582,464
23 Claims. (Cl. 181—.5)

ABSTRACT OF THE DISCLOSURE

A detector for detecting particle motion waves, such as seismic waves, in the presence of undesirable noise. Three components of particle motion are detected by three coordinate transducers, respectively, and the voltage outputs from the transducers are combined in a manner which suppresses noise waves arriving randomly from all directions and to indicate the direction of arrival of any particular wave train, such as might be caused by an earthquake, explosion, or moving vehicle. Each of the horizontal components of motion is electronically multiplied by the vertical component, with or without phase shift, and the two resulting products are displayed as a vector pointing to the source of the seismic waves.

---

This application is a continuation-in-part of application Ser. No. 361,641, filed Apr. 22, 1964, now abandoned.

This invention relates to the detection of seismic events, such as earthquakes and explosions, in the presence of isotropic noise waves. More specifically, the invention relates to the detection of seismic events by the time averaging of the product of components of velocity of a seismic wave.

Modern seismometers have the sensitivity to portray seismic noise well above any kind of instrumental noise, even under quiet conditions, so a further increase in sensitivity would not help detect weaker seismic signals. For observing some particular kinds of signal, electrical filters are used to advantage in discriminating against ambient noise. Even with the many improvements accomplished, however, research continues, and there is a great need for improved methods of detecting and identifying seismic signals in the presence of noise.

Therefore, the primary object of my invention is to provide an improved system and process for detecting and identifying seismic signals in the presence of noise.

A further object of my invention is to suppress noise waves arriving randomly from all directions by combining the voltages from a three-component seismometer and thereby detect a particular wave-train, such as might be caused by an earthquake, explosion, or moving vehicle.

Another object of my invention is to determine the direction of travel of a wave-train in the presence of random noise.

In a preferred embodiment of my invention, the presence of certain types of weak seismic signals or particle motion waves are determined by detecting two horizontal and one vertical components of the wave velocity, multiplying each horizontal component by the vertical component, integrating the products, and recording or displaying the results.

An alternate embodiment comprises detecting two horizontal and one vertical components of wave velocity, phase shifting the vertical component by 90°, multiplying each horizontal component by the phase shifted vertical component, integrating the products, and recording or displaying the results.

A second alternate embodiment for determining the presence of weak particle motion waves comprises, detecting two horizontal components of the wave velocity, multiplying the one component by the other and integrating the product, multiplying the sum of the components by the difference of the components and integrating the product, and recording the result.

Figure 1:
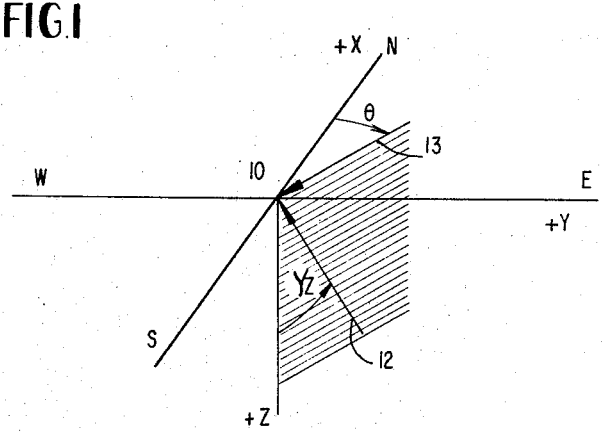
Figure 2:
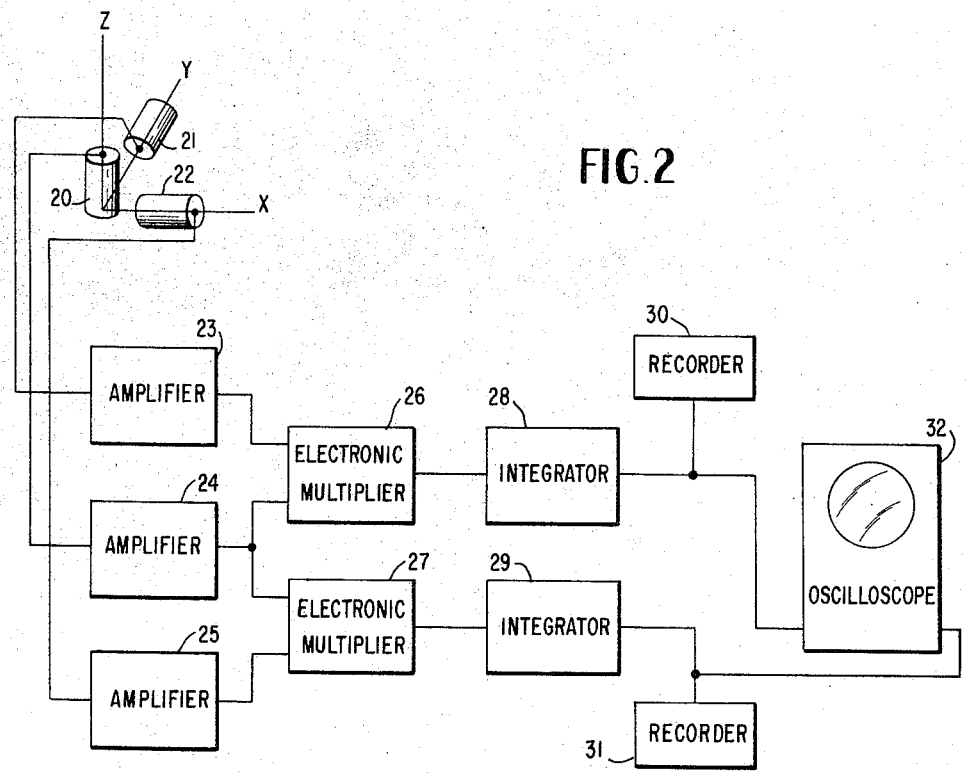
Figure 3:
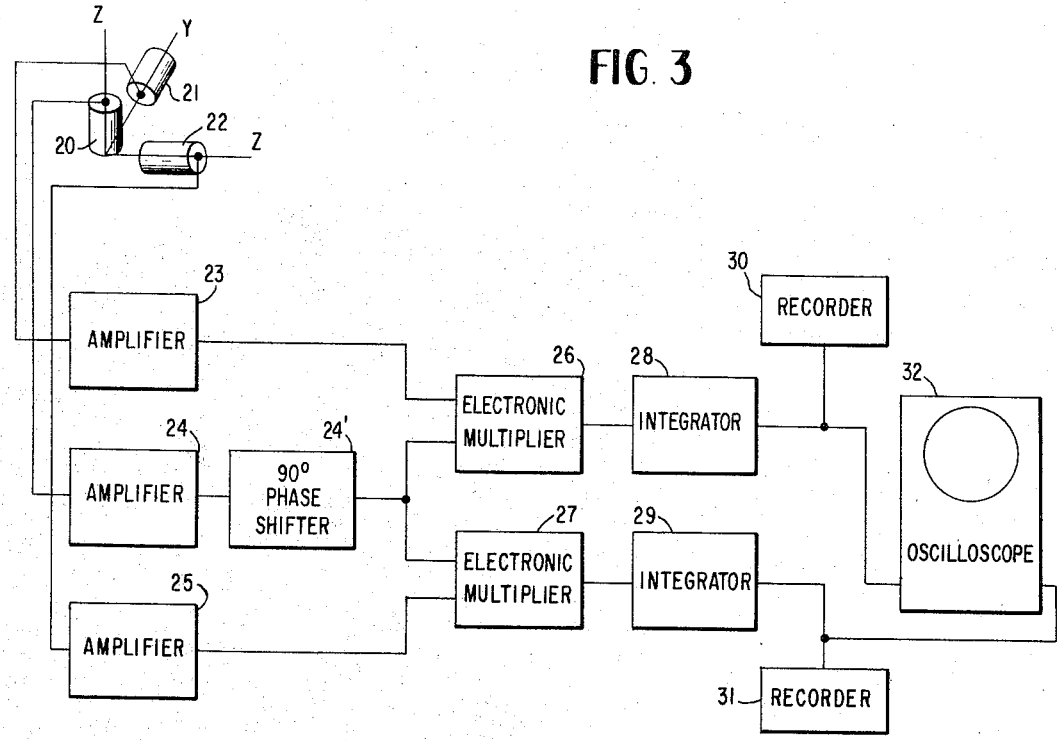
Figure 4:
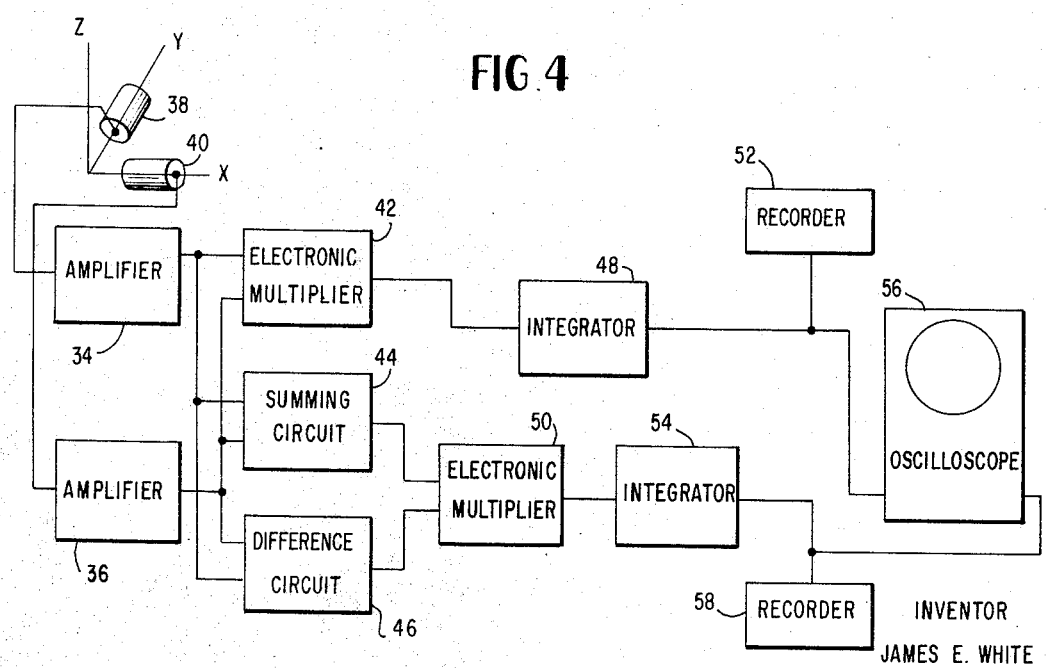

Other objects and a better understanding of the invention will appear by reference to the following description taken in conjunction with the accompanying drawings, in which:

FIGURE 1 is a coordinate diagram of the incoming wave,
FIGURE 2 is a block diagram of a preferred embodiment of the invention,
FIGURE 3 is a block diagram of an alternate embodiment of the invention,
FIGURE 4 is a block diagram of a second alternate embodiment of the invention, and
FIGURES 5, 6, 7 and 8 are block diagrams of other alternate embodiments of the present invention.

Referring to FIGURE 1, arrow 12 represents the direction of travel of a particle motion wave, due to an earthquake, explosion or other seismic event, as it arrives at point 10 where it is to be detected. Line NS represents the north-south line or $x$-coordinate of a three-dimensional coordinate system. Line EW represents the east-west line or $y$-coordinate. The $x$ and $y$ axes define the horizontal plane. Line $z$ is the $z$-coordinate or vertical coordinate. The angle of incidence of wave 12 is $\gamma_z$, and arrow 13 is the projection of wave 12 into the $x$-$y$ or horizontal plane. $\theta$ is the azimuth angle which defines the direction of the incoming wave.

Particle motion waves may be divided into six categories known as compressional waves, SV waves, Rayleigh waves, SH waves, Love waves, and isotropic noise waves. Actually, isotropic noise waves are combinations of the other types of waves. Some of these particle motion waves have the characteristic that the vertical and horizontal components of wave velocity are in phase with each other. One example of this type of wave is a compressional wave. For a compressional wave detected at the point 10 in FIGURE 1 and having a direction as shown by the arrow 12, the components of wave velocity along the $x$, $y$ and $z$ coordinates are:

$$V_x = V(\cos \theta) A f(t)$$
$$V_y = V(\sin \theta) A f(t)$$
$$V_z = V B f(t)$$

wherein $V_x$, $V_y$, and $V_z$ represent respectively the velocity components along the $x$, $y$ and $z$ axes; $V$ = the resultant velocity magnitude of the incoming wave; $A$ = a constant depending upon the angle $\gamma_z$; $B$ = another constant depending upon the angle $\gamma_z$; $f(t)$ = the waveform of the incident wave; and $\theta$ is the angle shown in FIGURE 1.

Multiplying each of the horizontal components $V_x$ and $V_y$ by the vertical component $V_z$ and time averaging (integrating over a period of time) the products, results in the following:

$$\bar{P}_x = \frac{1}{T}\int_0^T V_x V_z dt = (\cos \theta) A B V^2 \frac{1}{T}\int_0^T f^2(t) dt = K(\cos \theta)$$

$$\bar{P}_y = \frac{1}{T}\int_0^T V_y V_z dt = (\sin \theta) A B V^2 \frac{1}{T}\int_0^T f^2(t) dt = K(\sin \theta)$$

As will be explained below, the fact that $\bar{P}_x$ and $\bar{P}_y$ have values other than zero, indicates the presence of a particle motion wave, such as a compressional wave, and furthermore, the relative values of $\bar{P}_x$ and $\bar{P}_y$ determine the angle $\theta$ of the incoming wave.

Other types of waves, for example Rayleigh waves, exhibit the characteristic that the horizontal and vertical components of velocity are in phase quadrature. The velocity components of a Rayleigh wave detected at point 10 in FIGURE 1 would have the values:

$$V_x = V(\cos\theta)Af(t)_{(\pi/2)}$$
$$V_y = V(\sin\theta)Af(t)_{(\pi/2)}$$
$$V_z = VBf(t)$$

Since the horizontal and vertical components of velocity are in phase quadrature, the time averaged products of each horizontal component and the vertical component would equal zero. In other words, for a Rayleigh wave or other wave which exhibits a phase quadrature relation between the horizontal and vertical components:

$$\overline{P}_x = \frac{1}{T}\int_0^T V_x V_z dt = 0$$
$$\overline{P}_y = \frac{1}{T}\int_0^T V_y V_z dt = 0$$

Love waves and SH waves have no vertical component of velocity and thus the products of the horizontal components and the vertical component would always equal zero and therefore the integral of the products would be zero.

For isotropic noise, the time averaged products of the vertical component and the horizontal components will also equal zero. The assumption made here is that isotropic noise consists of waves of the types discussed above, generated at a multitude of wide distributed source points, and arriving equally from all directions at the point 10. Since the isotropic noise waves arrive equally from all directions, the time averaged product of any of the velocity components will equal zero.

Thus, it can be seen that by detecting two horizontal components of velocity and one vertical component of velocity of all particle motion waves arriving at point 10, multiplying each horizontal component by the vertical component, and time averaging the products, non-zero values will be obtained only if there is an incident compression wave or other wave whose horizontal and vertical components are in phase; and the relation of the time averaged products will indicate the direction from point 10 to the source of the particular wave.

It should be noted here that certain types of SV waves exhibit the property of in-phase horizontal and vertical velocity components, whereas other types of SV waves exhibit the property of phase quadrature vertical and horizontal velocity components. SV waves of the first type would also be detected by the process of multiplying each horizontal component of velocity by the vertical component of velocity and time averaging the resulting products.

To detect the presence of Rayleigh waves and SV waves of the second type which exhibit the property of having their horizontal and vertical components of velocity in phase quadrature, an extra step would be necessary. The equations for the vertical and horizontal components of a Rayleigh wave show that by phase shifting vertical component $V_z$ an amount equal to $\pi/2$, and then multiplying each horizontal component by the phase shifted vertical component, and time averaging the product, the following results are obtained:

$$\overline{P}_x = \frac{1}{T}\int_0^T V_x V_{z(\pi/2)} dt = (\cos\theta)ABV^2$$
$$\frac{1}{T}\int_0^T [f(t)_{(\pi/2)}]^2 dt = K(\cos\theta)$$

$$\overline{P}_y = \frac{1}{T}\int_0^T V_y V_{z(\pi/2)} dt = (\sin\theta)ABV^2$$
$$\frac{1}{T}\int_0^T [f(t)_{(\pi/2)}]^2 dt = K(\sin\theta)$$

Furthermore, by phase shifting the vertical components of compressional waves and SV waves of the first type prior to multiplication and time averaging, the products will average to zero and give no indication. The presence of Love wave and SH waves will not affect the result since they have no vertical component of velocity, and again, since the isotropic noise arrives equally from all directions, it will still time average to zero.

One method for detecting the presence of compressional waves and/or SV waves of the first type, is embodied in the block diagram of FIGURE 2. Each of the individual components shown in FIGURE 2 are old and form no part of this invention. Geophones 20, 21 and 22 are positioned at point 10 to detect the respective vertical components and horizontal components of wave velocity. Each of the detected components is individually amplified and filtered in amplifiers 23, 24 and 25. The output from amplifier 23 is connected to an electronic multiplier 26. The output from amplifier 25 is connected to an electronic multiplier 27. The output from amplifier 24 is connected to both electronic multipliers 26 and 27. The output from electronic multiplier 26 is applied to an integrator 28, and thence to the vertical plates of a cathode ray oscilloscope. The output of electronic multiplier 27 is applied to an integrator 29 and thence to the horizontal plates of a cathode ray oscilloscope 32. Recorders 30 and 31 may be connected, respectively, to the outputs of integrators 28 and 29.

As is well known in electronics arts, integrators are species of low pass filters. Thus it can be said that integrators and/or low pass filters perform a time averaging function on an electrical signal input.

In operation, each of the geophones 20, 21 and 22 detects the $z$, $y$ and $x$ components of velocity of all incoming waves along their respective axes. After amplification, the $y$ components and the $z$ components are multiplied in electronic multiplier 26 and time averaged in integrator 28. For all types of incoming waves other than compressional waves and SV waves of the first type, the output of integrator 28 will be zero. For a compressional wave or SV wave of the first type, the output of integrator 28 will be proportional to the sine of $\theta$. After amplification, the $x$ component of velocity and the $z$ component of velocity are multiplied in electronic multiplier 27 and time averaged in integrator 29. For compressional waves or SV waves of the first type, the output of integrator 29 is proportional to the cosine of $\theta$. By applying the output of integrator 28 to the vertical plates of the oscilloscope 32 and the output of integrator 29 to the horizontal plates thereof, the cathode ray beam is continuously deflected to present a visual display of the presence and direction of each of the detected waves. The recorders 30 and 31 are provided to give a permanent record of the presence of specified types of waves.

The apparatus shown in FIGURE 3 could be used to detect Rayleigh waves or SV waves of the second type and is identical to the apparatus of FIGURE 2 except for the addition of a 90° phase shifter 24' in the output of amplifier 24.

Figure 5:
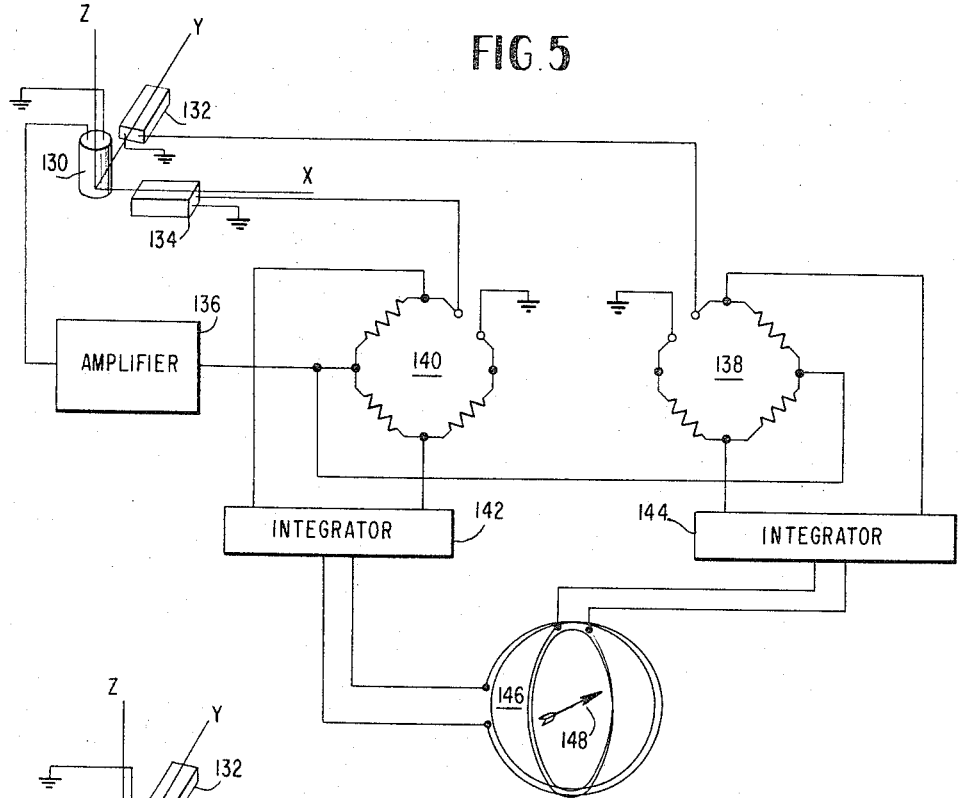

FIGURE 5 shows an alternate embodiment for detecting the same type of particle motion waves as detected by the system shown in FIGURE 3. That is, it detects particle motion waves having vertical and horizontal components of velocity which are in phase quadrature. The system comprises a geophone 130 positioned to detect vertical components of velocity and two strain gauge accelerometers 132 and 134 positioned along the $x$ and $y$ axes respectively. Strain gauge accelerometers 132 and 134 include resistive elements which are susspended in such a way that fractional changes in resistance occur in response to and are proportional to a selected component of particle acceleration. In the case of strain gauge 132, the selected component of particle acceleration is the $y$ horizontal component, and in the case of strain gauge 134, the selected component of particle acceleration is the $x$ component. Such strain gauges are well known in the art and may be, for example, strain gauges of the type which are sold by Statham Laboratories of Los Angeles.

The resistance element of strain gauge 134 is connected as one arm of a resistive bridge 140, and the resistive element of strain gauge 132 is connected as one arm of resistive bridge 138. The vertical component of velocity signal from geophone 130 is applied via amplifier 136 to resistive bridges 140 and 138. The output of each bridge is applied respectively to integrators 142 and 144. Since the output of a resistive bridge is the product of carrier voltage and resistance unbalance, the circuit shown in FIGURE 5 gives the product of vertical particle velocity and each of the components of horizontal particle acceleration. Each of the products is integrated by integrators 142 and 144 respectively and applied to a coil arrangement 146. Coil arrangement 146 includes two large coils mounted at right angles as indicated in the drawing. The output of integrator 142 is applied to coil 147, and the output of integrator 144 is applied to coil 149. The magnetic field at the center of one coil is perpendicular to the plane of the coil and proportional to the current through the coil. Hence, the magnetic field near the center of the two coils is a vector whose two components are proportional to products. Therefore, the direction of the magnetic field is an indication of the direction of travel of the seismic wave. A freely pivoted compass needle 148 will always align itself with the magnetic field of the two coils. With a suitable angular scale, not shown, such a needle will indicate the direction of propagation of seismic waves giving rise to the particle motion which actuates this system.

Figure 6:
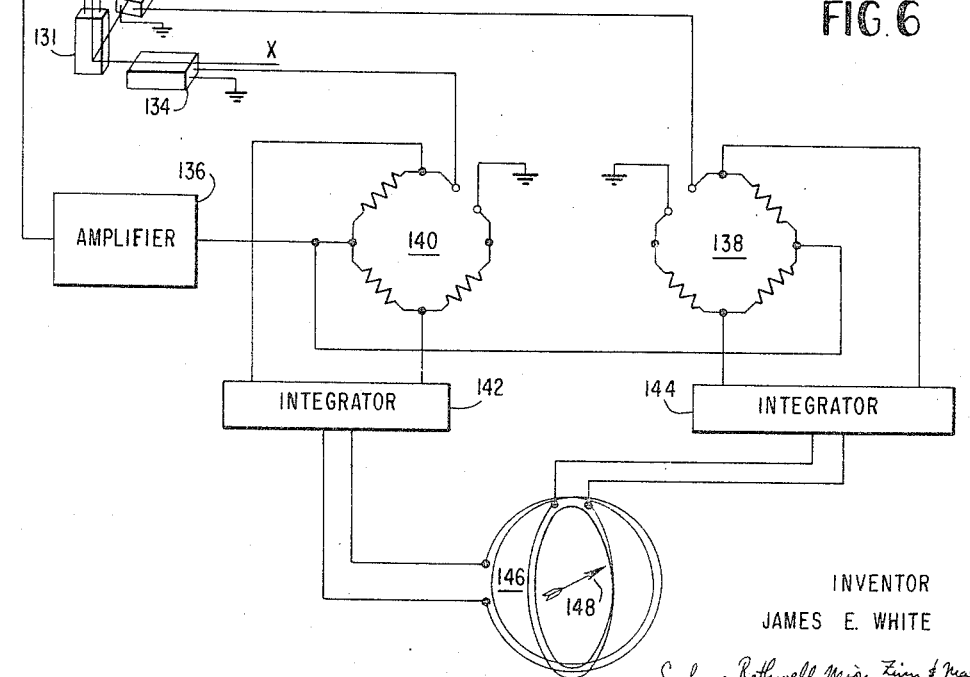

FIGURE 6 is identical to FIGURE 5 with the exception that a strain gauge accelerometer 131 is substituted for geophone 130. Strain gauge accelerometer 131 in combination with a current supply source provides a carrier signal to the two bridge circuits which is the vertical component of particle acceleration. The circuit shown in FIGURE 6 detects the same type of particle motion waves as detected by the system shown in FIGURE 2.

Figure 7:
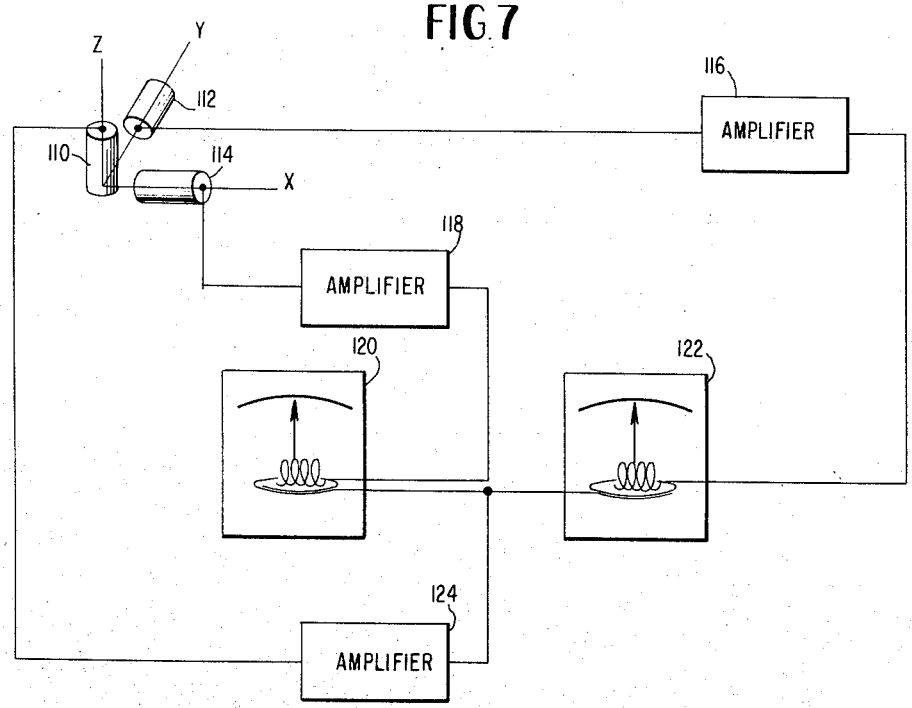
Figure 8:
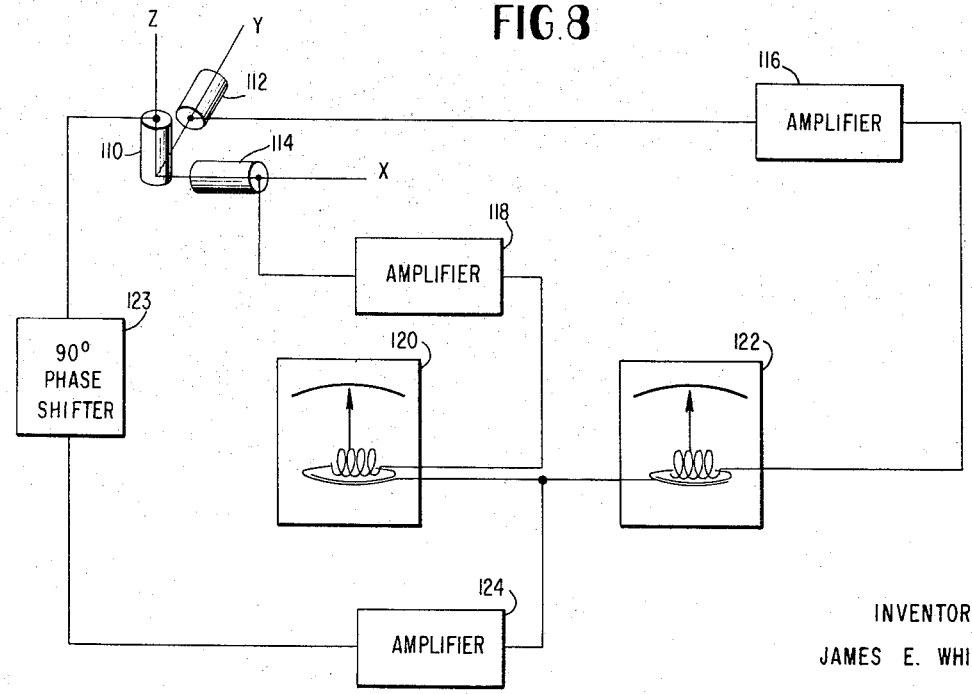

Other embodiments of the particle motion wave detectors are shown in FIGURES 7 and 8. FIGURE 8 is identical to FIGURE 7 except for the addition of a 90° phase shifter 123 in series with the geophone 110 and amplifier 124. The system of FIGURE 7 comprises geophones 110, 112 and 114 arranged respectively to detect components of particle velocity in the $z$, $y$ and $x$ directions. The outputs of the geophones are amplified by amplifiers 116, 118 and 124 respectively. The signal proportional to the vertical component of velocity is fed to the coils of dynamometer movements 120 and 122. The signals proportional to the $x$ and $y$ components of particle velocity are applied to the coils of dynamometer movements 120 and 122 respectively. In FIGURES 7 and 8, the force tending to deflect the needle of the dynamometer is proportional to the product of vertical particle velocity and one of the components of horizontal particle velocity. In this case, the mechanical suspension of the movement serves as an averaging filter. Meter 120 provides a measure of the $x$ component of direction and meter 122 provides a measure of the $y$ component of direction. Once the $x$ and $y$ components of direction are known, the actual direction of travel of the seismic wave is also known. FIGURE 7 detects particle motion waves of the same type as detected by the system shown in FIGURE 2, and FIGURE 8 detects the same type of particle motion waves as detected by the system shown in FIGURE 3.

A variation of the method described for detecting seismic events in the presence of isotropic noise eliminates the need for detecting the vertical component of velocity of the incident wave. For example, for any type of incident wave, making an angle $\theta$ with the $x$ axis, the horizontal components may be described as:

$$V_x = V(\cos \theta)f(t)$$
$$V_y = V(\sin \theta)f(t)$$

Instead of multiplying the horizontal components by the vertical component, two products could be formed by multiplying the $x$ horizontal component by the $y$ horizontal component and multiplying the sum of the two horizontal components by the difference between the two horizontal components. By integrating or time averaging these two products, the result would be:

$$\overline{P}_1 = \frac{1}{T}\int_0^T V_x V_y dt = V^2(\sin\theta)(\cos\theta)\frac{1}{T}\int_0^T f^2(t)dt$$
$$= V^2 \frac{(\sin 2\theta)}{2}\frac{1}{T}\int_0^T f^2(t)dt = K(\sin 2\theta)$$
$$\overline{P}_2 = \frac{1}{T}\int_0^T (V_x+V_y)\cdot(V_x-V_y)dt = K(\cos 2\theta)$$

The time averaged products $\overline{P}_1$ and $\overline{P}_2$ would have finite values for all types of waves except isotropic noise waves which would average to zero. By using this latter procedure, all types of waves can be detected notwithstanding the presence of interfering isotropic noise, and only two components of velocity need to be detected. It is evident from the above equation that applying the time averaged products $\overline{P}_1$ and $\overline{P}_2$ to the plates of a cathode ray oscilloscope would produce a display indicating a direction angle which is twice the azimuth of the incoming detected wave. The proper angle can be found by merely halving the indicated angle.

Apparatus suitable for detecting particle motion waves in accordance with the latter procedure is shown in FIGURE 4. The apparatus comprises two velocity detecting geophones 38 and 40 arranged to detect velocity components of an incoming wave. The output of the $y$ coordinate detecting geophone 38 is applied to amplifier 34 and the output of $x$ detecting geophone 40 is applied to amplifier 36. The outputs from amplifiers 34 and 36 are multiplied in electronic multiplier 42 to form the first product which is time averaged in integrator 48. The outputs from amplifiers 34 and 36 are also applied to summing circuit 44 and difference circuit 46. The output from summing circuit 44 is equal to the sum of the coordinate horizontal components of velocity and the output of difference circuit 46 is equal to the difference between the horizontal coordinate components of velocity. The latter two outputs are multiplied by electronic multiplier 50 and the resulting product formed thereby is time averaged in integrator 54. The outputs from integrators 48 and 54 may be applied to recorders 52 and 58, respectively, and to the vertical horizontal controls of an oscilloscope 56.

Although, throughout the specification, one of the steps of my invention has been described in terms of "time averaging," it is intended that such term is equivalent to and covers such other terms as integrating and filtering.

It should be obvious that the method and system of my invention will work equally well if the signals detected by the perpendicularly aligned geophones are recorded on a recording medium and are later reproduced, multiplied and time averaged in accordance with the invention.

The foregoing description of a preferred embodiment of the invention and certain modifications thereof may suggest other modifications to those skilled in the art, and it is intended to cover such modifications as fall within the scope of the appended claims.

What is claimed is:
1. A method of detecting a particle motion wave in the presence of noise waves comprising the steps of
    (a) detecting coordinate components of motion of the particle motion wave,
    (b) producing first and second product values solely from said components,
    (c) time averaging said first and second product values, and
    (d) providing an indication of said time averaged first and second valves.

2. The method defined in claim 1 wherein the step of detecting components further comprises the steps of
(a) detecting a first component along a first horizontal axis,
(b) detecting a second component along a second horizontal axis, and
(c) detecting a third component along an axis perpendicular to the plane formed by said first and second horizontal axes.

3. The method as claimed in claim 2 wherein the steps of producing product values comprises
(a) multiplying said first component by said third component to obtain the first product value, and
(b) multiplying said second component by said third component to obtain said second product value.

4. The method defined in claim 2 wherein the step of producing product values comprises
(a) phase shifting said third component,
(b) multiplying said first component by said phase shifted component to obtain said first product value, and
(c) multiplying said second component by said phase shifted component to obtain said second product value.

5. The method defined in claim 1 wherein the steps of detecting the motion components further comprises the steps of
(a) detecting a first motion component along a first horizontal axis, and
(b) detecting a second component along an east-west axis.

6. The method defined in claim 5 wherein the step of producing product values comprises
(a) multiplying said first component by said second component to obtain said first product value, and
(b) multiplying the sum of said first and second components by the difference between said first and second components to obtain said second product value.

7. A method for determining the direction of a particle motion wave comprising the steps of
(a) detecting first, second and third velocity components of the particle motion wave,
(b) time averaging the product of said first and third detected components to obtain a first value,
(c) time averaging the product of said second and third detected components to obtain a second value, and
(d) displaying the relative values of said first and second values.

8. The method of determining the presence and direction of a particle motion wave comprising the steps of
(a) detecting first and second components of the wave,
(b) integrating the product of said first and second components to obtain a first value,
(c) integrating the product of the sum and difference of said first and second components to obtain a second value, and
(d) providing an indication of said first and second values.

9. A method for determining the presence and direction of a particle motion wave comprising the steps of
(a) detecting first, second and third velocity components of said wave,
(b) phase shifting said third component 90°,
(c) time averaging the product of said first component and said phase shifted component to obtain a first value, and
(d) time averaging the product of said second component and said phase shifted component to obtain a second value.

10. A method for detecting the existence and direction of a particle motion wave in the presence of noise background, comprising the steps of
(a) detecting first and second horizontal velocity components of incident waves,
(b) detecting the vertical velocity components of said incident waves,
(c) phase shifting said detected vertical velocity components an amount equal to 90°,
(d) multiplying said first horizontal velocity component by said phase shifted vertical velocity component to obtain a first product,
(e) multiplying said second horizontal velocity component by said phase shifted vertical velocity component to obtain a second product,
(f) integrating said first product over a period of time to obtain a first value,
(g) integrating said second product over a period of time to obtain a second value, and
(h) displaying the existence and direction of the incident wave.

11. A system for detecting the presence and direction of a particle motion wave comprising
(a) means for detecting components of the wave velocity,
(b) means connected to said detecting means for generating, in response solely to said components, first and second product values of said detected components,
(c) integrating means connected to said generating means for time averaging said first and second product values, and
(d) display means connected to said integrating means for indicating the presence and direction of said particle motion wave.

12. The system defined in claim 11 wherein said detecting means comprise first, second and third transducers for detecting first, second and third components respectively of said wave velocity.

13. The system defined in claim 12 wherein said generating means comprises
(a) first multiplying means connected to said first and third transducers for multiplying said first and third components, and
(b) second multiplying means conected to said second and third transducers for multiplying said second and third components.

14. A method for determining the presence of a particle motion wave from recorded signals which are representative of coordinate components of velocity of incoming waves, comprising
(a) producing first and second product values solely from said recorded signals,
(b) time averaging said first and second product values, and
(c) providing an indication of the presence and direction of an incoming particle motion wave.

15. A system for detecting particle motion waves comprising
(a) a first geophone positioned to detect a first horizontal velocity component of incoming waves,
(b) a second geophone positioned to detect a second horizontal component of velocity of an incoming wave, wherein said second geophone is positioned along an axis perpendicular to the axis of said first geophone,
(c) a third geophone positioned to detect the vertical components of velocity of an incoming wave,
(d) first, second and third amplifiers connected respectively to the outputs from said first, second and third geophones,
(e) a first electronic multiplier and a second electronic multiplier,
(f) means for connecting the outputs from said first and third amplifier to the inputs of said first electronic multiplier and means for connecting the output of said second and third amplifiers to the inputs of said second electronic multiplier,
(g) first and second integrators,
(h) means for connecting the outputs from said first and second electronic multipliers to the inputs of said first and second integrators respectively, and (i) means responsive to the outputs from said first and second integrators for indicating the presence and direction of an incoming particle motion wave.

16. The method as claimed in claim 1 wherein said coordinate components of motion are coordinate components of velocity.

17. The method as claimed in claim 6 wherein said coordinate components of motion are coordinate components of velocity.

18. A system for detecting the presence and direction of a particle motion wave comprising
(a) first, second and third geophones positioned to detect perpendicular horizontal and vertical velocity components of a particle motion wave respectively,
(b) first, second and third amplifiers having their inputs connected respectively to the outputs of said first, second and third geophones,
(c) first and second dynamometers each having an indicator needle and a means for deflecting said needle,
(d) said first and second amplifiers having outputs connected respectively to said means for deflecting of said first and second dynamometers, and
(e) said third amplifier having an output connected to said means for deflecting of said first and second dynamometers.

19. A system as claimed in claim 18 further comprising a 90° phase shifter in series with said amplifer.

20. A system for detecting the presence and direction of a particle motion wave comprising
(a) first and second means for detecting horizontal coordinate motion components of a particle motion wave,
(b) third means for detecting the vertical motion component of a particle motion wave,
(c) first and second resistor bridge circuits comprising as one leg of the bridge respectively said first and second detecting means,
(d) means for applying the output of said third detecting means to the inputs of said first and second bridges,
(e) first and second time averaging circuits having their inputs connected respectively to the outputs of said first and second bridge circuits,
(f) first and second coils arranged perpendicular to each other and having a coincident center,
(g) means for connecting the outputs of said first and second time averaging means respectively to said first and second coils, and
(h) a magnetic indicator pointer suspended at said coincident center.

21. The system as claimed in claim 20 wherein said first and second detecting means are strain gauge accelerometers.

22. The system as claimed in claim 21 wherein said third detecting means is a geophone.

23. The system as claimed in claim 21 wherein said third detecting means is a strain gauge accelerometer.

References Cited

UNITED STATES PATENTS

| | | | |
|---|---|---|---|
| 2,779,428 | 1/1957 | Silverman | 181—0.5 |
| 2,982,942 | 5/1961 | White | 181—0.5 X |
| 3,180,139 | 4/1965 | Soderholm. | |

RODNEY D. BENNETT, *Primary Examiner.*

BENJAMIN A. BORCHELT, *Examiner.*

M. F. HUBLER, *Assistant Examiner.*